Patented Aug. 20, 1940

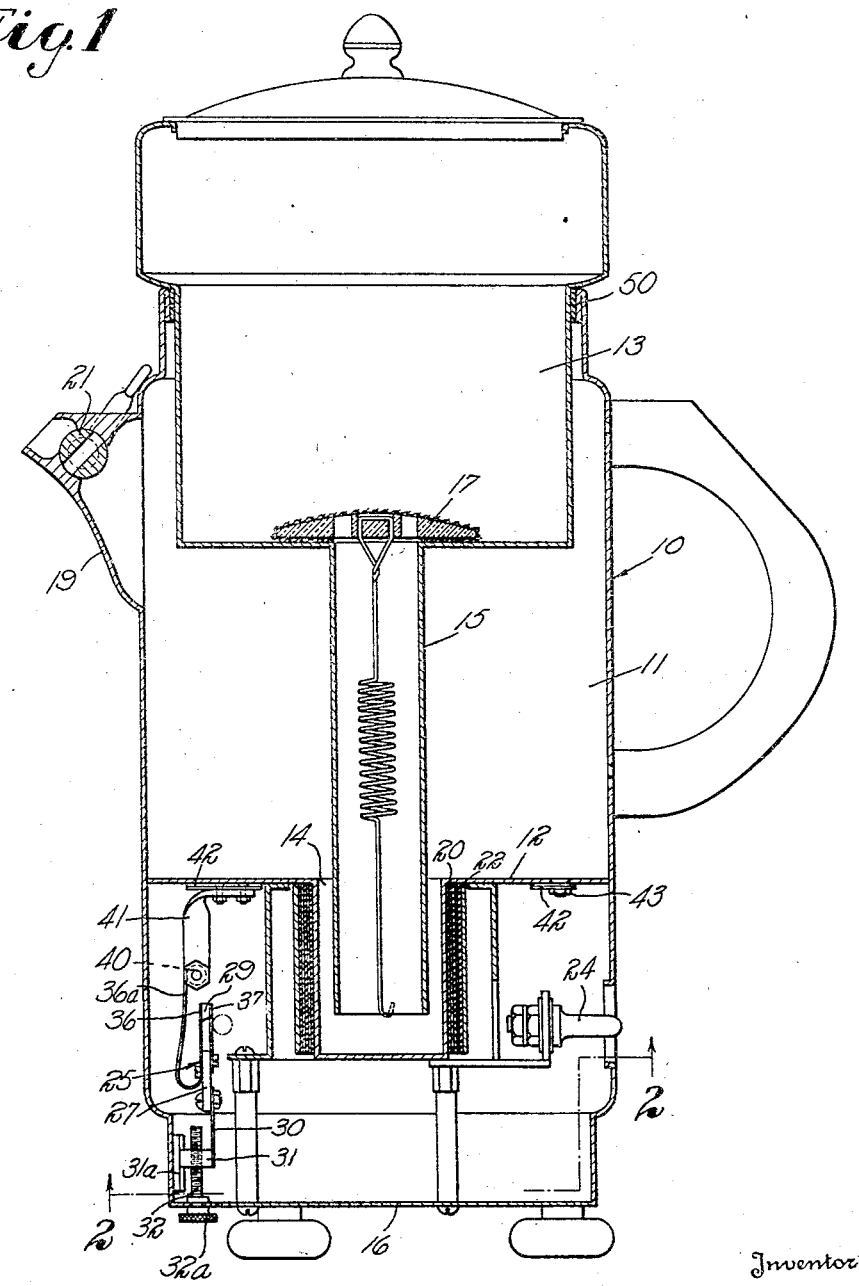

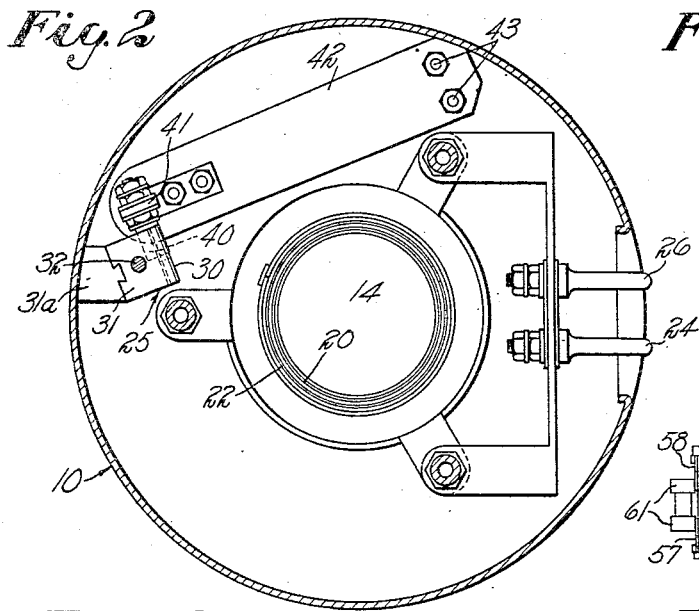
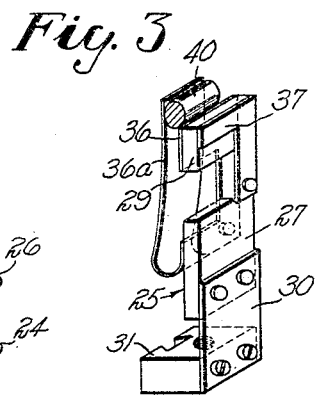
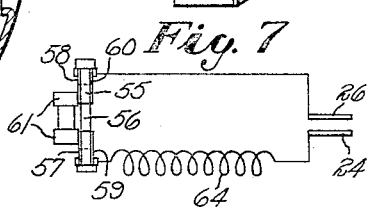
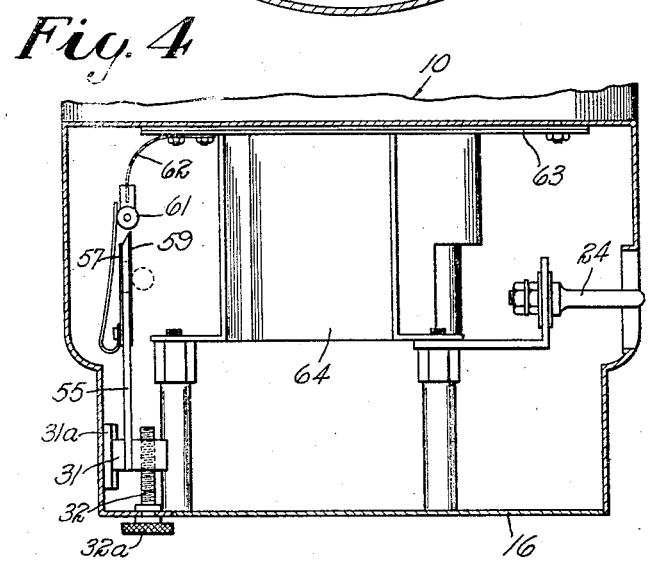
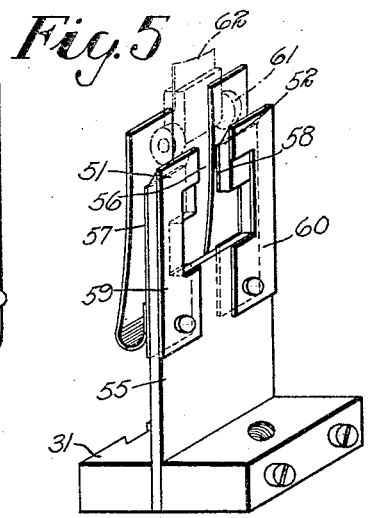
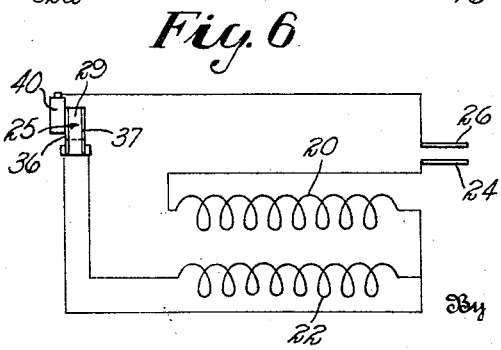

2,212,100

UNITED STATES PATENT OFFICE 2,212,100

COFFEE MAKER

Clyde D. Keaton, New York, N. Y., assignor to Stanley S. Tumbridge, Englewood, N. J.

Application March 22, 1938, Serial No. 197,349

19 Claims. (Cl. 219—44)

The present invention relates to electrically heated vessels and more particularly to electric coffee makers of the vacuum type wherein there is provided an upper chamber and a lower chamber and a tube interconnecting the chambers; the water to be heated being placed in the lower chamber and the coffee in the upper chamber.

An object of the present invention is a coffee maker of the above-mentioned type provided with means for automatically heating said water to a predetermined temperature to force it from the lower container into the upper container and then to provide a time lag during which the heat is cut off and then to re-apply heat sufficient to maintain the coffee or contents of the vessel warm after it has returned to the lower vessel.

A further object is a coffee maker wherein said heating means may be pre-adjusted and will function automatically upon the connection of the coffee maker to the source of power.

A still further object is a coffee maker wherein adjusting means may be incorporated to control the time which the heating elements are in operation and thus control the time of agitation to immerse the coffee grounds.

A still further object is a coffee maker provided with improved thermostatically controlled means for making and breaking the electric circuits; said means permitting the use of the device on either A. C. or D. C. current.

A still further object is a coffee maker wherein there is provided thermostatically controlled means adapted to maintain one heating circuit in operation for a predetermined period of time and then intermittently open and close another circuit so long as the device is electrically connected, and, upon being disconnected, to move into position to again close the first circuit.

A still further object is a device wherein there is provided a thermo-responsive element adapted when moving in one direction to close one circuit for a predetermined time and then open the circuit, and upon moving in the reverse direction close another circuit and to then intermittently open and close a second circuit so long as the device is electrically connected, and, when disconnected, to continue its movement in the reverse direction into position to close the first circuit.

A still further object is a coffee maker or heating vessel wherein the parts are extremely simple to manufacture and assemble and economical both in cost of manufacture and cost of operation.

Other objects will be in part obvious and in part pointed out more in detail hereinafter.

The invention accordingly consists in the features of construction, combination of elements, and arrangement of parts which will be exemplified in the construction hereafter set forth and the scope of the application of which will be indicated in the appended claims.

In the accompanying drawings:

Figure 1 is a sectional view of one embodiment of the invention;

Fig. 2 is a view on line 2—2 of Fig. 1;

Fig. 3 is a perspective view of the thermostatically controlled switch;

Fig. 4 is a view of another embodiment of the invention;

Fig. 5 is a perspective view of the type of thermostatically controlled switch utilized in Fig. 4;

Fig. 6 is a wiring diagram of the circuit shown in Figs. 1 and 2; and

Fig. 7 is a wiring diagram of the circuit shown in Fig. 4.

Referring to the drawings, and more particularly to Fig. 1, there is shown an electrically heated vessel in the form of a coffee pot or percolator 10 having a lower vessel or chamber 11 provided with an inner bottom 12 in which there is centrally located a well 14. There is further provided an outer bottom 16 spaced from bottom 12 to form a compartment in which the thermostatic control elements, hereinafter described, are located. The lower vessel 11 is provided with a pouring spout 19 which may be closed to atmosphere by a valve 21 having a suitable actuating handle thereon.

Fitting within vessel 11 is an upper vessel or chamber 13 having a tube 15 centrally located in the bottom thereof and extending down and into the well 14 of vessel 11. The mouth of tube 15 may be covered by any suitable type of strainer 17. In order to make an air-tight fit between vessel 11 and 13, there is provided a suitable gasket 50. The foregoing elements are common to coffee pots and particularly those of the "vacuum" type.

In accordance with the present invention, there is provided a thermostatic element 42 responsive to the temperature of the water and vessel; a heating element 20 adapted to produce high or cooking heat; a heating element 22 adapted to be placed in series therewith to increase the resistance and to produce low or warming heat; and a double acting thermostatic switch 25 adapted to control the heating elements in response to the movements of the thermostatic responsive element 42.

The switch member 25 comprises generally a body support member 27 of suitable insulating material and which may be rectangular in shape. The support has an outwardly projecting contact arm 29 of predetermined length as measured from its top to bottom edge at the top thereof and is secured at its base to a resilient member 30 which in turn is secured to a nut 31 which is adjustable up and down on screw 32 upon actuation of a knob 32a rotatably mounted in bottom 16. Rotation of nut 31 is prevented by a tongue 31a secured to the wall of the pot and received within a groove in the nut 31.

The arm 29 carries on one side a fixed contact 36 including an extending spring finger 36a, and on the other side is a fixed contact 37; the contacts being conveniently secured to the support. The fixed contact 36 extends from the top edge of the arm to the bottom thereof, and the extension finger 36a extends above arm 29, for reasons hereinafter described. The finger 36a is preferably of resilient metal and curved inwardly toward the guide member 27. The contact 37 may or may not cover arm 29, and in the embodiment shown it extends but approximately half way down the arm, for reasons hereinafter explained.

Cooperating with the fixed contacts of arm 29 is a sliding or movable contact 40 carried at right angles to and insulated from an arm 41 and projects inwardly therefrom a distance less than the width of arm 29. The arm 41 depends from the free end of a thermostatic responsive element 42; said element 42 having the other end secured to container bottom 12 at 43. The element 42 is so positioned that the center of contact 40 is slightly to the left of the vertical center of arm 29 when the element 42 is cold.

The electrical connections may best be seen from Fig. 6, and, as there indicated, contact 36 is electrically connected through the high heat element 20 to the usual plug receiving terminal 24, whereas contact 37 connects through both heating elements 20 and 22 to the same plug. The sliding contact 40 is connected directly to the other plug terminal 26. It will thus be seen that there are in effect two switches having a common closure and means for successively closing the switches through the common closure.

Considering the operation of the device shown in Figs. 1, 2, 3, and 6, the lower chamber 11 is partially filled with water and valve 21 closed. The upper chamber, with strainer 17 in place, is then inserted in the lower chamber. The usual connecting plug is then inserted over terminals 24, 26. Generally, arm 29 is so adjusted through support 27 that the contact 36 through finger 36a engages contact 40 when the device is cold, normally maintaining the circuit through the high heating element 20. As the heat from element 20 begins to heat the water, element 42 will respond to the change of temperature and the free end thereof will move away from the bottom of the pot, lowering contact 40 while maintaining it in engagement with contact 36a. As contact 40 is mounted on the free end of the thermo-responsive element 42, it will move counterclockwise in the arc of a circle as the free end of the thermo-responsive element is lowered in response to the increased heat of the vessel. As the arm 29 and the fixed contacts thereon lie in the path of movement of the contact 40, the movement thereof will simultaneously cause arm 29 and its support 27 to flex in a clockwise direction relative to the supporting element 30, and due to the tendency of support 27 to return to its normally vertical position the contacts will yieldingly remain in engagement.

The travel of contact 40 will be relatively slow until the pressure in chamber 11 builds to a degree which will force the water up into chamber 13. The heat will now travel relatively faster from bottom 12 to element 42, causing rapid lowering of contact 40. The amount of travel required of contact 40 after the water rises will control the "gurgling" or "agitation" time of the water in the upper chamber. However, as long as heat is applied, the contact 40 will continue to be lowered and will move past the arm 29, whereupon support 27 will straighten up and move arm 29 past the center of contact 40 and to the opposite side thereof, instantaneously breaking the circuit through high heating element 20. The contact 40 will now be positioned to the right of arm 29.

As the element cools, contact 40 will rise and be carried in a reverse arc to its downward movement and again engage arm 29, but on the opposite side thereof. However, when used in conjunction with a vacuum coffee maker, a time lag is desirable to assure breaking of the vacuum in the lower vessel 11, and it is for this reason that contact 37 extends but a short distance from the top of arm 29, thus delaying its being engaged by contact 40. As contact 40 rises, it will flex arm 29 counterclockwise and after rising the predetermined amount will engage contact 37 and close the circuit through the heating elements 20 and 22. The contact 40 will then float on and off of contact 37 as the heat rises and lowers, and due to the small area of contact 37 the circuit will make and break rapidly and the temperature will be maintained within a very close range. When the connecting plug is pulled and the device cools off, contact 40 will be carried above arm 29, which will flex back to its normal position, and the parts will again be positioned as seen in Fig. 1. Thus it will be seen that contact 40 is successively brought into engagement with the contacts on either side of arm 29 and the length of arm 29 may be proportioned to cause the thermo-responsive element to move through a predetermined distance during each successive engagement therewith.

Although it is preferred to have the switch 25 pre-adjusted before leaving the factory (in which instance the adjusting feature may be omitted), it is possible, through member 32a, to vary the length of time contact 40 engages contact 36. As very little adjustment is required to obtain various degrees of brew, it will be seen that when positioned as in Fig. 1 contacts 40 and 36 will be in engagement for a maximum period, whereby by raising switch 25 the distance 40 must travel to the lower edge of arm 29 is reduced. By lowering support 27, engagement between contact 36 and 40 may be broken, and thus no circuit would be established were the device plugged in.

It is also apparent that the flexible finger 36a, which is electrically connected and forms part of contact 36, may be entirely omitted and the contact 36 raised into engagement with the contact 40 when it is desired to close the circuit. However, when the contact 40 moves to the low side, the arm 29 will be positioned to prevent contact 40 from riding over same when the device cools, and it will be necessary to lower arm 29 and again raise it to close the circuit for the high heating element. However, should the device be plugged in before this is done, it will be seen that the circuit for the low heating element will be closed, and as this produces extremely low heat no damage to the device will occur. In like manner, if the device is plugged in when empty and with the high heating circuit established, the contact 40 would travel rapidly to the low heat side and the intermittent action of the low heating element would be insufficient to damage the device. Because of this feature, the fuse usually found in such devices may be eliminated.

With the foregoing construction, it is also possible to use the device with either A. C. or D. C. current, for the contacts of the high heating coil are separated with such rapidity due to the snap action of the movable contact that no sparking results. As there is relatively little current through the low heating coil, no sparking will result between the intermittent make and break of the contacts on the low heating side. When the coffee is made, the valve 21 may be opened and the coffee poured therefrom, as with the usual type percolator.

In the embodiment shown in Figs. 4 and 5, there is provided a support or guide member 55 rigidly secured to the adjusting nut 31. The member 55 may be rectangular in shape and provided with an opening 56 extending from the top edge and generally of the shape of an inverted T to form oppositely disposed spaced contact arms 51 and 52. As in the previous embodiment, there is provided fixed contacts on the opposite sides of arms 51 and 52 conveniently supported on 55; the contacts 57 and 58 being on the cooking side and contacts 59 and 60 on the warming side of the respective arms. The contacts are adapted to be spanned by a sliding contact 61 carried on but insulated from the resilient arm 62 depending from the thermo-responsive element 63. The contact 61 is wide enough to engage arms 51 and 52 of T opening, whereas the supporting arm 62 is narrow enough to pass through the opening 56 therebetween.

In the embodiment of Fig. 4 only one heating element is used, and, as diagrammatically illustrated in Fig. 7, contacts 58 and 60 are electrically connected to terminal 26 and contacts 57 and 59 to terminal 24 through the heating coil 64. The operation is similar to that of Fig. 1 in that the switch members are movable relative to one another. However, in Figs. 4 and 5, the guide member 55 is fixed and the sliding contact arm 62 is resilient. Thus, as arm 62 is lowered by the thermo-responsive element 63, contact 61 will be restrained and arm 62 will tend to straighten out. Upon contact 61 travelling a predetermined distance greater than the length of arms 51 and 52, arm 62 will resume its natural curvature, instantaneously breaking the heating circuit, and be positioned on the opposite side of the contact arms. As contact 61 is carried upwardly, it will again engage member 55 and contacts 59 and 60 to again close the circuit.

Inasmuch as the thermo-responsive element 63 will be lowered again as soon as the temperature reaches a desired degree, contact 61 will again be lowered by element 63 and intermittently make and break same. Thus, the cooking and warming may be done with but a single circuit by first maintaining same closed for a period of time long enough to cook as the thermo-responsive element moves in one direction, and then causing the circuit to be intermittently closed as the return movement of the element is repeatedly arrested. As element 63 rises and contact 61 engages contacts 59 and 60, the arm 62 will be given a greater degree of curvature, and when the device cools and contact 61 rises above arms 51 and 52, it will resume its normal starting position.

The second embodiment may be regulated in like manner to the first, and, in like manner to the first, both high and low sides are adjusted simultaneously, thus maintaining a constant temperature lag therebetween.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A coffee maker comprising a lower chamber and an upper chamber, a tube connecting said chambers, a heating circuit disposed adjacent said lower chamber, switch means for said heating circuit, and a flat thermo-responsive element normally positioned to be responsive to radiant heat from said lower chamber and having one end fixed to said lower chamber and its other end free and adapted upon movement in one direction to maintain said circuit closed for a predetermined period of time and then open said circuit, and to again close said circuit after a predetermined movement in the other direction.

2. A coffee maker comprising a lower chamber and an upper chamber, a tube connecting said chambers, a heating circuit disposed adjacent said lower chamber, a switch for said heating circuit, and thermo-responsive means normally positioned to be responsive to radiant heat from said lower chamber and adapted upon movement in one direction to actuate said switch to open said circuit and upon movement in another direction to close said circuit.

3. A coffee maker comprising a lower chamber and an upper chamber, a tube connecting said chambers, a heating circuit disposed adjacent said lower chamber and adapted to give high heat, a second heating circuit adjacent said lower chamber and adapted to give low heat, switch means for said circuits normally closing said high heating circuit, and thermo-responsive means controlling said means and adapted to open said high circuit after a predetermined movement in one direction and to close said low circuit after a predetermined movement in a reverse direction.

4. A coffee maker comprising a lower chamber and an upper chamber, a tube connecting said chambers, a heating circuit disposed adjacent said lower chamber and adapted to give high heat, a second heating circuit disposed adjacent said lower chamber and adapted to give low heat, switch means for said circuits, thermo-responsive means adapted to open said high heating circuit upon a predetermined movement in one direction and to close said low heating circuit upon a predetermined movement in a reverse direction, and to again open said low heating circuit and close said high heating circuit upon a further movement in the reverse direction.

5. A coffee maker comprising a lower chamber and an upper chamber, a tube connecting said chambers, a heating circuit disposed adjacent said lower chamber, a fixed contact for said circuit and a movable contact, an arm of predetermined length supporting said fixed contact, a thermo-responsive element supporting said movable contact, said element having a greater movement than the length of said supporting arm, whereby upon movement of said element said heating circuit will be maintained closed for a predetermined period of time and then opened.

6. A coffee maker comprising a lower chamber and an upper chamber, a tube connecting said chambers, a heating circuit disposed adjacent said lower chamber, a pair of fixed contacts for said circuit and a movable contact, an arm supporting said fixed contacts in spaced relation, said arm being of a predetermined length, a thermo-responsive element supporting said movable contact and adapted to move same a greater distance than the length of said contact supporting arm, whereby said circuit will be maintained closed for a predetermined period of time and then opened, and means for moving said arm to the other side of said movable contact whereby said circuit will be again closed when said movable contact is carried in a reverse direction.

7. A coffee maker comprising a lower chamber and an upper chamber, a tube connecting said chambers, a heating circuit disposed adjacent said lower chamber, a thermo-responsive element having one end fixed to said lower chamber and its other end free to move in the arc of a circle, a contact carried on the free end of said thermo-responsive element, an arm disposed in the path of travel of said movable contact, a fixed contact co-extensive with one side of said arm, a second fixed contact on the other side of said arm and extending only partially along same, and a flexible member supporting said arm and adapted to be flexed out of position as said movable contact engages said fixed contact and to return to unflexed position the other side of said movable contact when said movable contact has moved across said arm, whereby said contact will engage the second arm contact when moved in the opposite direction.

8. A coffee maker comprising a lower chamber and an upper chamber, a tube connecting said chambers, a heating circuit disposed adjacent said lower chamber, a thermo-responsive element having one end fixed to said lower chamber and its other end free to move in the arc of a circle in one direction when heated and in a reverse direction when cooled, a contact carried on the free end of said element, an arm disposed in the path of said movable contact, contacts carried on both sides of said arm, said movable contact engaging one of said contacts as the element moves downwardly, means for flexing said arm to the other side of said movable contact when it has moved a predetermined distance, whereby said movable contact will engage the second arm contact as it makes a reverse movement.

9. A coffee maker comprising a lower chamber and an upper chamber, a tube connecting said chambers, a heating circuit disposed adjacent said lower chamber and adapted to produce high heat, a second heating circuit disposed below said chamber and adapted to produce low heat, a thermo-responsive element having one end fixed to said lower chamber and its other end free to move in the arc of a circle in response to the heat produced, a contact carried on the free end of said element, an arm lying in the path of said contact, a contact on one side of said arm adapted to close said high heating circuit when engaged by said movable contact, a contact on the other side of said arm adapted to close said low circuit when engaged by said movable contact, and means flexibly supporting said arm, whereby said contacts will be successively brought in contact with said movable contact as it moves in opposite directions.

10. A coffee maker comprising a lower chamber and an upper chamber, a tube connecting said chambers, a heating circuit adjacent said lower chamber and adapted to give high heat, a second heating circuit disposed adjacent said lower chamber and adapted to give low heat, a thermo-responsive element having one end fixed to said lower chamber and its other end free to move in the arc of a circle, a contact resiliently carried on the free end of said element, an arm disposed in the path of travel of said movable contact, a contact on one side of said arm adapted to close said high heating circuit when engaged by said movable contact as it moves in one direction, and a second contact carried on the other side of said arm and adapted to close said low heating circuit when engaged by said movable contact as it moves in a reverse direction.

11. In an electrically heated vessel, a heating circuit, a thermo-responsive element having a fixed end and a free end, a contact movably carried by said free end, a second contact lying in the path of said movable contact and adapted to be engaged by same to close the heating circuit, and means for throwing said movable contact to the other side of the second contact when it has moved across same to open the circuit.

12. In an electrically heated vessel, a heating circuit, a thermo-responsive element adapted to move in one direction upon application of heat and in reverse direction upon cooling, a contact carried by said element and movable therewith, a second contact lying in the path of said fixed contact and adapted to engage same to close the circuit, said movable contact sliding across said second contact in response to movement in one direction of the thermo-responsive element, and means for throwing said movable contact to the other side of said second contact to open the circuit after it has moved across same.

13. In an electrically heated vessel, a heating circuit, a thermo-responsive element adapted to move in one direction upon application of heat and in reverse direction upon cooling, a contact carried by said element, and movable therewith, a second contact lying in the path of said first contact and adapted to engage same to close the heating circuit, said movable contact sliding across said second contact in response to movement in one direction of the thermo-responsive element, one of said contacts being flexibly mounted, whereby it will throw to the other side of the other contact after a predetermined movement of the thermo-responsive element in the other direction.

14. In an electrically heated vessel, a heating circuit, a thermo-responsive element adapted to move in one direction upon application of heat and in reverse direction upon cooling, a contact carried by said element and movable therewith, a second contact lying in the path of said first contact and adapted to engage same to close the heating circuit, said movable contact sliding across said second contact in response to movement in one direction of the thermo-responsive element, one of said contacts being flexibly mounted, whereby it will throw to the other side of the other contact after a predetermined movement of the thermo-responsive element in the other direction, and a third contact on the other side of said second contact adapted to be engaged by said movable contact as the thermo-responsive element moves in the reverse direction.

15. In an electrically heated vessel, a heating circuit, a pair of contacts fixed to a common flexible support, a movable contact, and thermo-responsive means for successively bringing said movable contact into engagement with the fixed contacts to control said heating circuit.

16. In an electrically heated vessel, a heating circuit, a thermo-responsive element carrying a movable contact at its free end and having its other end fixed to the vessel, whereby its free end will move in the arc of a circle, a pair of contacts adapted to be engaged by said movable contact, a flexible member supporting said contacts and adapted to be flexed out of position when said contacts are engaged and to return to unflexed position when said element has moved the movable contact a predetermined distance.

17. In an electrically heated device, a heating circuit, a thermo-responsive element having a fixed end and a free end, a contact carried by said free end, a second contact lying in the path of said first contact and adapted to be engaged by same to close the heating circuit, and means for throwing said first contact to the other side of said contact when it has moved across same to open the circuit.

18. In a coffee maker, a heating circuit disposed adjacent the bottom thereof and adapted to give high heat, a second heating circuit adjacent the bottom thereof and adapted to give low heat, switch means for said circuits normally closing said high heating circuit, and thermo-responsive means controlling said switch means and adapted to open said switch and high heating circuit after a predetermined movement in one direction and to close said switch and said low heating circuit after a predetermined movement in a reverse direction.

19. In a coffee maker, a heating circuit disposed adjacent the bottom thereof, a thermo-responsive element having a fixed end and a free end adapted to move in the arc of a circle in one direction when heated and in a reverse direction when cooled and positioned to receive radiant heat from said coffee maker, a contact carried on the free end of said movable contact, an arm disposed in the path of said movable contact, contacts carried on said arm, said movable contact engaging one of said contacts as the element moves downwardly, and means for disengaging said contacts when said first contact has moved a predetermined distance downwardly, whereby said movable contact will engage the second arm contact as it makes a reverse movement.

CLYDE D. KEATON.

DISCLAIMER 2,212,100.—*Clyde D. Keaton*, New York, N. Y. COFFEE MAKER. Patent dated August 20, 1940. Disclaimer filed February 17, 1941, by the assignee, *Stanley S. Tumbridge.*

Hereby enters this disclaimer to claim 2 in said specification.
[*Official Gazette March 11, 1941.*]

DISCLAIMER 2,212,100.—*Clyde D. Keaton*, New York, N. Y. COFFEE MAKER. Patent dated August 20, 1940. Disclaimer filed May 19, 1942, by the assignee, *Stanley S. Tumbridge*.

Hereby enters this disclaimer to claim 1 in said specification.

[*Official Gazette June 16, 1942.*]